US011429692B2

(12) United States Patent
Page et al.

(10) Patent No.: US 11,429,692 B2
(45) Date of Patent: Aug. 30, 2022

(54) PROCESSING MATRIX VECTOR MULTIPLICATION

(71) Applicant: Myrtle Software Limited, Cambridgeshire (GB)

(72) Inventors: David Page, Cambridgeshire (GB); Christiaan Baaij, Cambridgeshire (GB); Jonathan Shipton, Cambridgeshire (GB); Peter Baldwin, Cambridgeshire (GB); Graham Hazel, Cambridgeshire (GB); Jonathan Fowler, Cambridgeshire (GB)

(73) Assignee: Myrtle Software Limited, Cambridgeshire (GB)

( * ) Notice: Subject to any disclaimer, the term of this patent is extended or adjusted under 35 U.S.C. 154(b) by 629 days.

(21) Appl. No.: 16/421,852

(22) Filed: May 24, 2019

(65) Prior Publication Data
US 2019/0361954 A1  Nov. 28, 2019

(30) Foreign Application Priority Data
May 25, 2018  (GB) ..................................... 1808629

(51) Int. Cl.
*G06F 3/06* (2006.01)
*G06F 17/16* (2006.01)
(Continued)

(52) U.S. Cl.
CPC ............ *G06F 17/16* (2013.01); *G06F 3/0604* (2013.01); *G06F 3/064* (2013.01); *G06F 3/0659* (2013.01);
(Continued)

(58) Field of Classification Search
None
See application file for complete search history.

(56) References Cited

U.S. PATENT DOCUMENTS

| 10,565,207 B2* | 2/2020 | Huang ................ H03M 7/3066 |
| 10,984,074 B2* | 4/2021 | Narayanamoorthy ...................... G06F 9/30145 |
| 2012/0143932 A1 | 6/2012 | Fossum |

OTHER PUBLICATIONS

Van der Veen, Marcel, "Sparse Matrix Vector Multiplication on a Field Programmable Gate Array," Sep. 30, 2007, Retrieved from the Internet on Aug. 27, 2019; https://essay.utwente.nl/781/1/scriptie_van_der_Veen.pdf.

(Continued)

*Primary Examiner* — Scott C Sun
(74) *Attorney, Agent, or Firm* — Stanek Lemon Crouse & Meeks, PA (57) ABSTRACT

A size M×N sparse matrix, including zero values, is multiplied with a size N vector, using a processor arrangement. A data storage linked to the processor arrangement stores the matrix in a compressed formal. Zero values are not stored. The data storage stores the vector as vector parts, each of a respective size $K_i$, $1 < K_i < N$ and $i = 1 \ldots P$. A vector part comprises a vector element in common with another vector part. Each vector part is stored in a distinct memory block. Each of a plurality of the non-zero values of a matrix row is associated with a memory block storing an element of the vector having an index corresponding with a respective index of the non-zero value. The processor arrangement multiplies, in parallel, each of the plurality of the non-zero values of the matrix row by the respective vector element having a corresponding index stored in the associated memory block.

19 Claims, 5 Drawing Sheets

(51) Int. Cl.
*G06F 16/2455* (2019.01)
*G06F 16/901* (2019.01)

(52) U.S. Cl.
CPC ...... *G06F 3/0673* (2013.01); *G06F 16/24558* (2019.01); *G06F 16/9024* (2019.01)

(56) References Cited

OTHER PUBLICATIONS

Azad et al., "Distributed-Memory Algorithms for Maximum Cardinality Matching in Bipartite Graphs," 2014 IEEE 28$^{th}$ International Parallel and Distributed Processing Symposium, May 23, 2016, pp. 32-42.

Rafique et al., "Communication Optimization of Iterative Sparse Matrix-Vector Multiply on GPUs arid FPGAs," IEEE Transactions on Parallel and Distributed Systems, IEEE Service Center, Los Alamitos, CA, vol. 26, No. 1, Jan. 1, 2015, pp. 24-34.

Notification of Transmittal of the International Search Report and the Written Opinion of the International Searching Authority, or the Declaration, PCT/GB2019/051435, Mar. 9, 2020, 15 pages.

Search Report Under Section 17(5), GB 1808629.8, dated Nov. 30, 2018, 3 pages.

\* cited by examiner

PROCESSING MATRIX VECTOR MULTIPLICATION

CROSS REFERENCE TO RELATED APPLICATION

This U.S. non-provisional patent application claims priority under 35 U.S.C. § 119 to Great Britain Patent Application No. 1808629.8, filed May 25, 2018, with the Intellectual Property Office of the United Kingdom, the content of which is hereby incorporated herein by reference in its entirety.

TECHNICAL FIELD OF THE INVENTION

The disclosure concerns multiplication of a matrix of size M×N with a vector of size N, particularly when the matrix is a sparse matrix. A method and/or a computing system for such multiplication operations is provided.

BACKGROUND TO THE INVENTION

Multiplication of a matrix by a vector Is a well-established task for computing systems, with applications in a range of scientific and engineering systems, for example computational fluid dynamics, neural networks, robotics and others. Increasingly, specialist computing systems use programmable logic circuits, for example a Field Programmable Gate Array (FPGA), for specific tasks including matrix vector multiplication.

Modern FPGAs have a large number of scalar arithmetic processors, as well as the ability to synthesise further processors within the reprogrammable logic of the chip. A challenge for implementing matrix vector multiplication evaluation using this technology is to feed a sufficient number of these processors with productive work, in parallel. Similar problems may exist in other hardware systems.

For dense matrices, this problem is relatively straightforward owing to the regular data access patterns. In particular, a standard approach is to compute a dot product between a single matrix row and the vector in a fully parallel manner by provisioning one scalar multiplication unit for each entry of the vector. These processors each need access to a single vector entry, which can be stored in local registers, and a stream of matrix entries corresponding to consecutive elements in a single matrix column. At each clock cycle, each processor multiplies their respective vector entry with their current matrix entry. The result is then passed to an adder tree, which can then output a full dot product at each clock cycle. Further parallelism is possible by processing multiple matrix rows in parallel.

The challenge is much greater when multiplying a sparse matrix with a dense vector. A sparse matrix has only a small proportion of non-zero entries (less than 40% and more preferably less than 20% and most preferably less than 10%). Sparse matrices can be stored in a compressed format, for example with the non-zero values stored densely along with additional information to indicate their locations in the matrix.

A naïve approach to sparse matrix vector multiplication is to use a dense matrix multiplier as discussed above, but this is highly inefficient. Such an approach cannot make full use of the arithmetic processors on the board, since only a small proportion of these (given by matrix's density, which may be derived from its sparsity, for example such that sparsity=1−density) are productively active at each clock cycle.

Approaches seeking to adapt the dense matrix vector multiplication approach have faced difficulties. The number of non-zero elements in a matrix row is approximately the matrix density times the number of elements in the vector (that is, its size). It would be desirable to provision roughly this number of scalar multiplication units, so that each one has productive work to do during each clock cycle. Unlike the dense matrix case, processing a sparse matrix in this way means that each processor will need access to a different vector entry at each cycle. Providing sufficient random access bandwidth to the vector makes such implementations impractical using existing architecture.

Alternative approaches to the sparse matrix times vector multiplication problem have typically involved passing a single vector entry to multiple processors at each time step and parallelising across a matrix column (rather than across a matrix row as above). The difficulty that these approaches face is that a random access write operation (rather than a read as above) is required at the output of each processor. This simply changes the location of the problem without overcoming it. Moreover, in this type of approach, results of the matrix vector multiplication are produced simultaneously at the end of the process, rather than in a row-by-row sequence at each clock cycle. This limits the opportunities for pipelining of downstream operations.

"A High Memory Bandwidth FPGA Accelerator for Sparse Matrix-Vector Multiplication". Powers et al. 2014 IEEE 22nd Annual International Symposium on Field-Programmable Custom Computing Machines (FCCM). 11-13 May 2014, recognises the problem of irregular memory access characteristics. It proposes a sparse matrix encoding that explicitly exposes parallelism across rows by encoding non-zero elements with reference to a channel slot. By encoding the matrix in this format initially, the parallel processing of multiplications across multiple rows is possible, which can then be decoded to obtain the multiplication result. This approach may be more efficient than other existing approaches, but its efficiency is still limited, and it maintains the same problems as seen with other approaches using column-based parallelism, such as complexity scalability.

Another approach is discussed in "Accelerating Persistent Neural Networks at Datacenter Scale", Chung et a. Hot Chips 29: A Symposium on High Performance Chips, Aug. 20-22, 2017. Cupertino, Calif., USA. Here, the matrices are distributed row-wise across banks of Block RAM (BRAM), with each BRAM providing input to a multi-lane dot product unit. The vector is broadcast to the multi-lane dot product units to improve efficiency.

Another existing approaches for a general matrix multiplication (GEMM) have been evaluated by Baidu Research under the name DeepBench (https://github.com/baidu-research/DeepBench#sparse-gemmresults). The results in this research indicate that multiplication with matrices have a sparsity of less than 99% (that is, a density of at least or greater than 1%) are not efficiently processed by current approaches, but that in theory, matrices with a sparsity of at least 90% could be processed as efficiently as dense matrices. Thus, further techniques to improve the efficiency of sparse matrix vector multiplication are desirable, especially for matrices with a density greater than 1%.

SUMMARY OF THE INVENTION

Against this background, there is provided a method for multiplication of a matrix of size M×N with a vector of size N in accordance with claim 1, a computer program in line with claim 14 and a computing system as defined by claim 15. Further features of the invention are detailed in the dependent claims and discussed herein.

The basic approach of this disclosure is Jo store the vector in parts in respective memory blocks, advantageously with at least some commonality between parts (particularly allowing reading from multiple memory blocks and/or multiple vector parts concurrently). Then, each row can be processed in turn, with non-zero elements of the row each being associated with a memory block storing an element of the vector having a corresponding index (in principle, with a one-to-one mapping). As a consequence, the multiplication of each of the non-zero elements of the row of the matrix by the corresponding element of the vector is performed in parallel. Beneficially, the sparse matrix may be stored in a compressed format (such that zero values are not stored). The approach can be implemented as hardware (for example on a programmable logic circuit, such as a FPGA), software (such as a computer program) or a combination of the two. For instance, a computing system may be provided in accordance with this approach. The hardware may have structural features to implement any of the method steps disclosed herein.

By storing the vector across multiple blocks with redundancy (that is, repetition of one or more vector elements) between blocks, the multiplication operations can be performed in a parallel, similarly to dense matrix vector multiplication. The memory blocks and/or vector parts may advantageously be accessible (for read and/or write purposes) in parallel, for example using distinct memory devices (each storing a distinct memory block), or having a memory device with multiple read ports. Efficiency of this approach can be high, even for matrices having at least 2% density, preferably 5%, 6%, 7%, 8%. 9%. 10% density or higher and in some embodiments, no more than 20%, 30% or 40% density. The parallel processing may be performed by multiplication hardware (in a processor arrangement) that may comprise multiplier blocks or units, each multiplying one of the plurality of the non-zero values of the row of the matrix by the respective element of the vector having a corresponding index.

In some embodiments (especially programmable logic circuits), each memory block is part of a different respective memory device. Each element of the vector may be assigned to one or more of the plurality of vector parts, for example based on a structure of the matrix. The step of storing may then be performed in accordance with the assigning. For example, the vector parts may each be stored as a contiguous sequence of elements of the vector (so that one stored vector part may overlap with another stored vector part), stored as (precisely) specified subsets of elements of the vector, stored as a randomly (or pseudo-randomly) selected grouping of elements of the vector or a combination of these options. An alternative approach is for each vector part to comprise a selection of up to one element from each of a plurality of non-overlapping subdivisions of the vector. Each of the non-zero values of the row of the matrix can be stored in the associated memory block (storing the respective element of the vector having a corresponding index). This may further improve processing speed.

In a preferred embodiment, the matrix can be pre-processed to determine the specified (advantageously, optimal) subsets of the vector elements to store in each memory block. The pre-processing of the matrix can result in subsets such that, for example, one or more of: the sizes of the memory blocks are equalised (so they all hold the same number of elements); the size of the biggest memory block is minimised; and the subsets are compatible with the circuit used to fill the memory blocks from the vector input. Any one or more of these may be considered optima. Alternatively, if desired the subsets could be determined by a suitable pseudo-random algorithm.

The parallel multiplication operations are preferably performed in a single clock cycle. In preferred embodiments, all of the non-zero elements of a row of the matrix can be associated with a respective (distinct) memory block storing a corresponding element of the vector. Then, the multiplication operation for each row can be performed in a single clock cycle and all the multiplications may be complete in M clock cycles, in other embodiments, only some of the non-zero elements of a row of the matrix can be associated with a respective (distinct) memory block storing a corresponding element of the vector. As a result, the multiplication operation for such a row may be performed in two (or possibly more than two) clock cycles.

Once all of the multiplications for the row have been completed, the results of each of the (preferably parallel) multiplications are added or summed, to provide a single multiplication output for the row of the matrix. This may be performed by an adder tree for instance. Then, the single multiplication output for the row of the matrix may be stored. The associating and multiplying steps may be repeated (typically sequentially) for each row of the matrix.

The association of vector parts (or the respective memory block in which each vector part is stored) with the non-zero elements of the matrix can be performed using a bipartite graph matching algorithm, such as Hopcroft-Karp algorithm or a maximum flow algorithm.

The vector parts preferably have the same size. The size of each vector part may be greater than the size of the vector divided by the number of vector parts. The total number of elements stored in all of the vector parts divided by the size of the vector (which will be at least 1) may provide a rough measure of the level of redundancy.

BRIEF DESCRIPTION OF THE DRAWINGS

The invention may be put into practice in various ways, some of which will now be described by way of example only and with reference to the accompanying drawings in which.

DETAILED DESCRIPTION OF A PREFERRED EMBODIMENT

In a general sense, matrix vector multiplication of the disclosure may consider a matrix of size M×N (that is, M rows and N columns) and a vector of size N (that is, N rows and a single column). The matrix is a sparse matrix including a zero values. Preferably, the density of the sparse matrix is at least 1%. The density of the matrix is no more than or optionally less than 40% (60% sparsity), typically no more than (or less than) 30% (70% sparsity) or 20% (80% sparsity) and more preferably no more than (or less than) 10% (90% sparsity) or 5% (95% sparsity). A density of between 5% and 15% is most preferred, with 6.25% and (less preferably) 12.5% being possible more optimal values.

Figure 1:
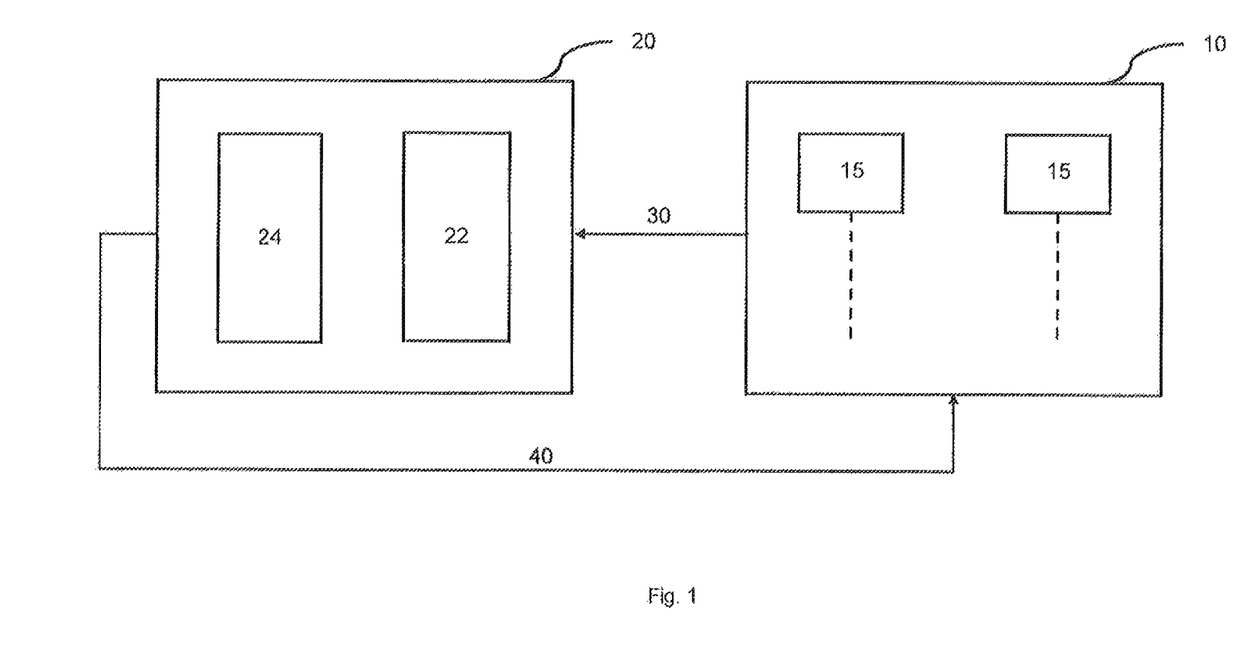
FIG. 1 shows a schematic block diagram of a computing system in accordance with the disclosure.

Referring first to FIG. 1, there is shown a schematic block diagram of a computing system, which can be implemented in accordance with the disclosure. This implementation focuses on an FPGA system, but alternative systems using a similar or equivalent configuration can be considered. The computing system 1 comprises: data storage 10; and a processor arrangement 20. Specifically, the data storage 10 comprises a plurality of memory devices 15. The processor arrangement 20 comprises: a multiplier arrangement 22, and an adder tree 24. The processor arrangement 20 accesses the data storage 10 to receive stored data 30 as inputs and to store outputs 40. Thus, the data storage 10 is linked to the processor arrangement 20, in particular to allow read and/or write access. The multiplier arrangement 22 comprises a plurality of multiplier units (not shown).

Figure 2:
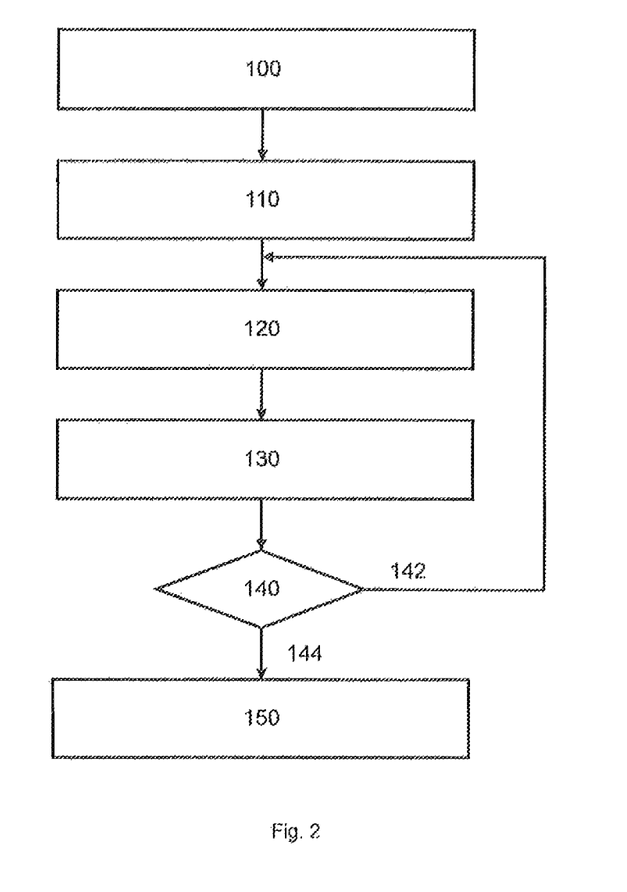
FIG. 2 depicts a flowchart illustrating a series of steps in accordance with the disclosure.

Now with reference to FIG. 2, there is depicted a flow-chart illustrating a series of steps in accordance with the disclosure. These steps may be implemented on a computing system such as shown in FIG. 1 as either hardware (such as programmed logic) or software (implementing the processor arrangement through one or more microprocessors, for instance), although they may alternatively be implemented in software in a different type of computing system.

A first storage step 100 stores the matrix in data storage 10, in a compressed format, such that zero values are not stored. The non-zero values can be stored densely (that is, explicitly) along with additional information to indicate their locations. The other locations are then understood to comprise zero values.

A second storage step 110 stores the vector in data storage 10 as a P vector parts (P>1). Each vector part is of a respective size $K_i$, $1<K_i<N$ and $i=1 \ldots P$. Preferably, the size of each vector part is the same (K). At least one vector part comprises at least one element of the vector in common with at least one other vector part. In other words, there is redundancy or overprovisioning between the vector parts. In this way, some or all of vector may effectively be replicated at least once and potentially multiple times, typically into overlapping windows of for example, 64 consecutive entries in respective memory blocks. The size of each vector part. $K_i$, is typically greater than the size of the vector (N) divided by the number of vector parts (P) to allow this. The total number of elements stored in all of the vector parts (that is the sum of $K_i$ over $i=1 \ldots P$) divided by the size of the vector (N) may provide a rough measure of the level of redundancy (for example, 1.1 indicating a 10% redundancy, 1.15 indicating 15% redundancy, 1.2 indicating 20% redundancy, etc.).

Each vector part is stored in a distinct memory block of the data storage 10. Each memory block can then provide random access to one scalar value at each clock cycle to a single processor (in processor arrangement 20). This arrangement may not allow full random access onto the vector for each processor, but rather onto a small subset of values (which in one example may be a "window" of values, such that at least one or each of the vector parts comprises a contiguous sequence of elements of the vector). This small subset of values can be chosen so that some or all of the nth row of the vector (for $n=1 \ldots N$) is stored in at least two distinct memory block of the data storage 10. This provides a degree of overprovisioning. Preferably, each memory block is part of a different respective memory device 15.

With this arrangement it can be proven statistically, or via a simple static analysis, that for a given matrix, with a limited degree of overprovisioning, that each processor (in multiplier arrangement 22) has access to all the relevant vector values needed to process each row of the matrix. For large matrices, for example of 3000 rows, a small number of rows will typically determine the worst-case overprovisioning needed to supply values for each row.

The first storage step 10 and second storage step 15 may be carried out in any order and indeed, they may be carried out in parallel. They are only shown sequentially in FIG. 2 for simplicity.

In associating step 120, each of a plurality of the non-zero values of a row of the matrix Is associated with a respective memory block that stores an element of the vector having an index corresponding with a respective index of the non-zero value, in other words, each non-zero value in a row has an index (that is, its column number n, $1 \le n \le N$) is to be multiplied by the $n^{th}$ element of the vector. This $n^{th}$ element of the vector is stored in at least one of the memory blocks. Typically, a single row of the matrix is processed at one time. The associating step 120 therefore finds, for each of the non-zero elements in a row, one or more memory blocks in which the element of the vector having the corresponding index is stored and then associates that non-zero element with one memory block. Preferably, this association is a one-to-one mapping, such that each non-zero element is associated with a different memory block. Advantageously, all of the non-zero elements in the row are associated with distinct memory blocks.

In order to allocate non-zero indices to vector parts (especially those using "windows" as discussed below), several approaches can be used. For instance, the known Hopcroft-Karp algorithm or another bipartite graph matching algorithm, can be used by having vector parts form one set of nodes, non-zero indices form the other set and then having edges join indices to vector parts that contain them. Other maximum flow algorithms could be used (additionally or alternatively).

In multiplying step 130, each of the non-zero values of the row of the matrix is multiplied by the respective element of the vector having a corresponding index stored in the associated memory block (as associated in associating step 120). These multiplications are performed in parallel, for example with each multiplication being performed by a multiplier unit of the multiplier arrangement 22. Optionally, each of the plurality of the non-zero values of the row of the matrix is stored in the associated memory block storing the respective element of the vector having a corresponding index, to allow the multiplication to take place using a single memory block. Typically, each of these parallel multiplications is carried out by a respective multiplier processor in the multiplier arrangement 22. Alt of the parallel multiplications (and optionally associations) are performed in a single clock cycle of the processor arrangement 20 (it may be assumed that the processor arrangement 20 operates with a single, common clock). The results of each of the (parallel) multiplications are added (optionally, as part of multiplying step 130), to provide a single multiplication output for the row of the matrix, for example using the adder tree 24. Advantageously, the single multiplication output for the row of the matrix is stored in the data storage 10 (which again may optionally be part of multiplying step 130).

Next, it is checked in decision step 140 whether all of the rows of the matrix have been processed. If not, repeat path 142 is taken, so that associating step 120 and multiplying step 130 are repeated for a different row of the matrix. In other words, the steps of associating and multiplying may be sequentially repeated for each row of the matrix, A simple way to achieve this would be for the first iteration of the flowchart to process the first row of the matrix, the second to process the second row, and to continue sequentially until the last row has been processed. However, other sequences are possible, for example depending on the sparse matrix structure. If all of the matrix rows have been processed, end path 144 is taken and the procedure completes in termination step 150.

Processing the matrix row-by-row is better than processing it column-by-column. The latter approach would mean that replicating or overlapping the outputs would incur additional expenses and this limits the overall scalability of the approach as well as adding complexity to the circuit.

Figure 3:
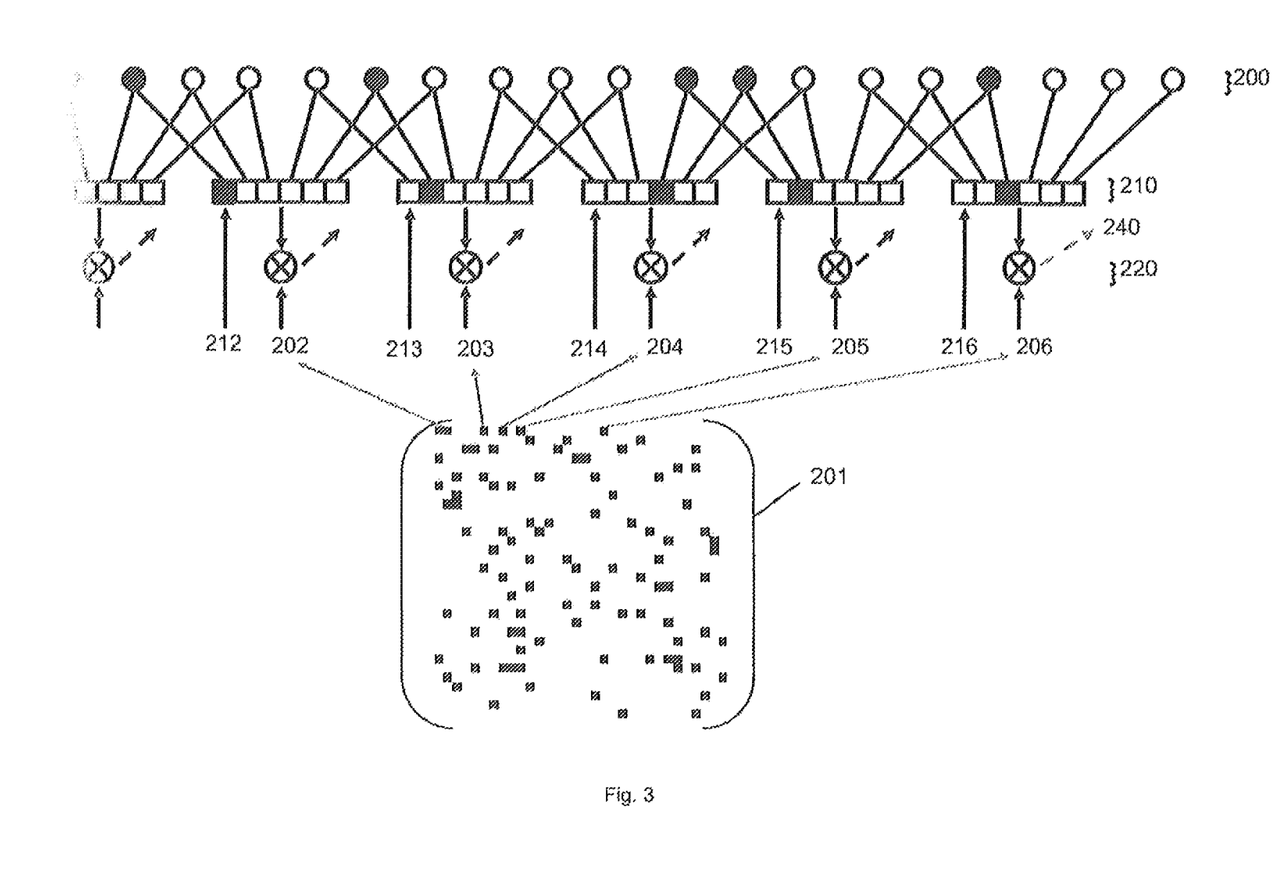
FIG. 3 schematically illustrates an example implementation in accordance with the disclosure.

An example is now discussed for completeness, with reference to FIG. 3, in which an example implementation is schematically illustrated. In this example, there is shown; vector 200; sparse matrix 201; distributed memory units 210 (for example, called "MLABs" in terminology used by Intel® or called "SLICEM" in terminology used by Xilinx®); multipliers 220; and paths to an adder tree 240. Each multiplier is associated with a respective individual distributed memory unit 210.

Vector 200 is stored as a series of vector parts, each of which is stored in a respective distributed memory unit 210. In this example, each vector part contains a "window" (that is a contiguous portion) of the vector that overlaps with at least one other vector part storing earlier (that is, lower index) elements of the vector and at least one other vector part storing later (that is, higher index) elements of the vector. This is shown by the lines joining each of the elements of vector 200 either to a single distributed memory unit 210 (for elements that are unique to that vector part) or to two distributed memory units 210 (for elements that overlap two vector parts and are therefore stored in multiple distributed memory units 210). In practice, it is advantageous that at least 10%, 20%, 30%, 40%, 50%, 60%, 70%, 80%, 90% or 100% of elements of the vector 200 are stored in multiple distributed memory units 210.

In sparse matrix 201, some of the processing of the first row is shown, comprising: first non-zero value 202, second non-zero value 203; third non-zero value 204; fourth non-zero value 205; and fifth non-zero value 206. Each non-zero value 202, 203, 204, 205 and 206 is provided to a respective multiplier 220 as a first input. A second input to each multiplier 220 is provided as an output from the associated distributed memory unit 210. The respective index (that is column number) corresponding with each of the non-zero values 202, 203, 204, 205 and 206 (comprising: first index 212; second index 213; third index 214; fourth index 215; and fifth index 216) is used to determine the correct element stored in the respective distributed memory unit 210, such that this element of vector 220 has the same index (in the case of the vector, row number) as the index of the non-zero element of the sparse matrix 201 that is provided as the first input to the respective multiplier 220. This matching between non-zero elements of the sparse matrix 201 and vector parts stored in the distributed memory units 210 is done in the associating step 120, as discussed above, for example using a bipartite graph matching algorithm.

Each multiplier 220 carries out multiplication of the respective non-zero element of the sparse matrix 201 and the corresponding element of the vector 200. These multiplications advantageously are performed in parallel in a single clock cycle, so that all of the results of the multiplications occur at the same time. Each result is passed to an adder tree 240, so that the sum of all of the multiplication results is found and can be stored as an element of a dot product output matrix (preferably in the data storage 10).

The improved efficiency of this process, when implemented as a silicon circuit and compared to the current state of the art, has been demonstrated by implementing it on an FPGA. A key desideratum to making this approach work on an FPGA is that modern designs typically contain roughly the right number and size of small distributed memories to provide one such memory for each scalar multiplier. This allows for roughly equal numbers of hardened arithmetic units and synthesised multipliers. It should be noted that any sparse matrix can be pre-processed (as discussed above), so that locations of non-zero values are provided as indices into the distributed memories, as shown with reference to FIG. 3. Since random access to these memories is supported by the FPGA hardware, there is minimal logic required to support the random access routing at runtime.

Figure 4A:
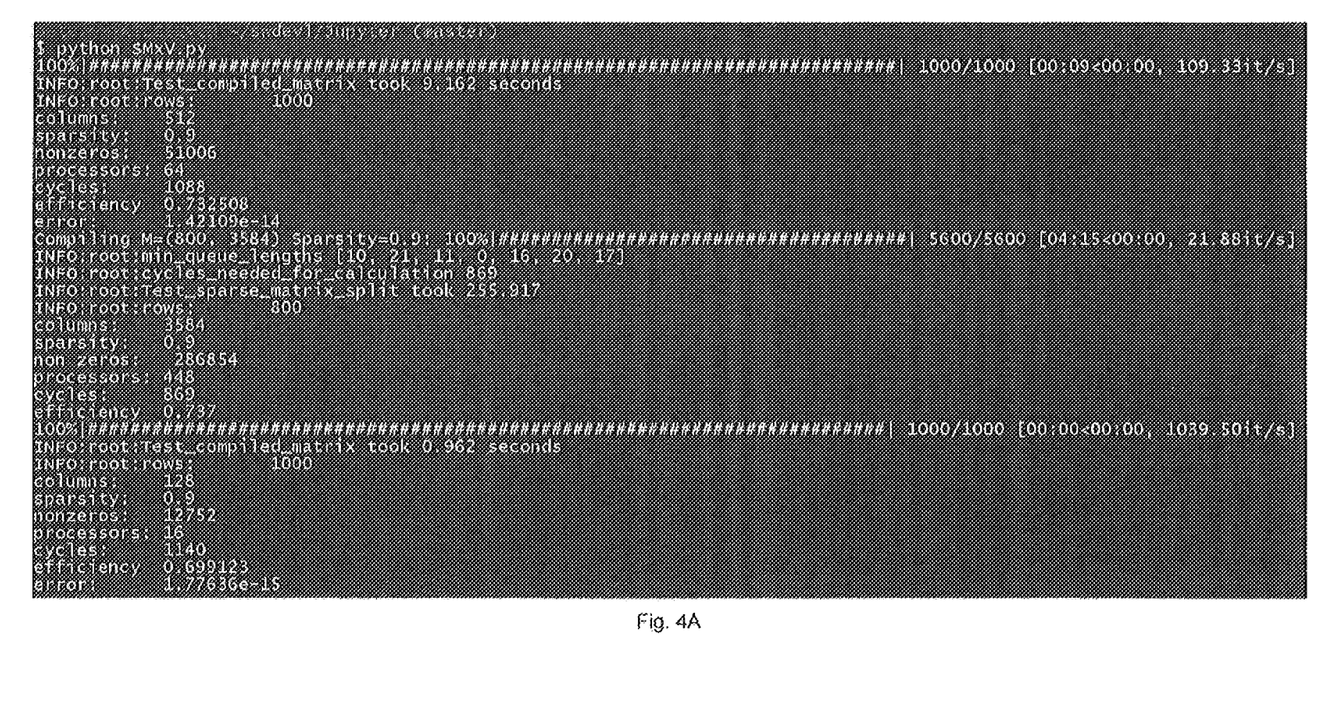
FIGS. 4A and 4B show screenshots of the results of a software implementation in accordance with the disclosure.
Figure 4B:
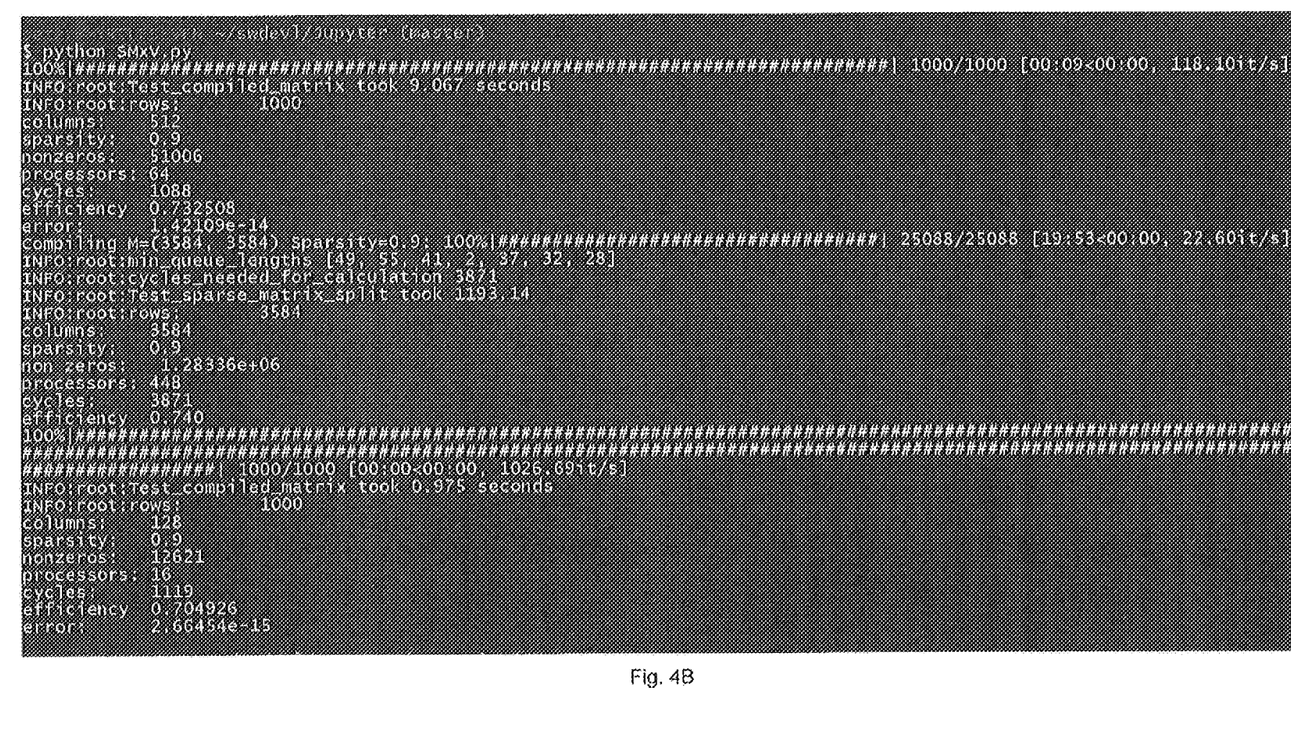

Software code that allows modelling of the number of clock cycles and the efficiency of the hardware designs for multiplication of matrices of arbitrary size and sparsity is provided in Appendix A, below. Using this model and the electronic circuits that have already been built using the method described herein, improvement over the current state of the art (specifically those discussed in the background above) can be shown. Referring to FIGS. 4A and 4B, there are shown screenshots of the results of this software implementation. These results are shown for tensors of varying dimension and sparsity, with the efficiency is calculated using the Python code implementation of provided in Appendix A.

Two designs have been modelled in these approaches: one using scalar multiplier processors (design A), and She other using multipliers synthesised in the FPGA's reconfigurable logic (design B). For a matrix with a 1000 columns. 10% sparsity, no over provisioning, and using a Stratix® 10 FPGA produced by the Intel Corporation, the resources for a circuit that can provide a single dot-product at a time using the technique presented herein, the following resources may be required. For design A: 278 adaptive logic modules (ALM), 100 MLABs, 35 dedicated 20 kB Random Access Memories (M20K), 50 digital signal processors (DSP) are used with a 500 MHz clock. For design B: 4200 ALMs, 100 MLABs, 35 M20K, 0 DSP are used with a 500 MHz clock. Calculating multiple rows in parallel, on a Stratix® 10 GX2800 device produced by the Intel Corporation, design A can be instantiated 116 times and design B can be instantiated 103 times. This can perform the following number of multiplications and addition operations (OPS) per second:

2×1000×0.1 sparsity×(116+103)×500 MHz=21.8 TeraOPS (TOPS).

Thus, at 10% sparsity and no over-provisioning, this equates to 218 TOPS of dense matrix times vector multiplication, which is over two times better than the fastest dense matrix vector multiplier circuit described in "A High Memory Bandwidth FPGA Accelerator for Sparse Matrix-Vector Multiplication". Powers et al (fully referenced above), which achieves 90 TOPS. Compared to existing sparse matrix vector multiplications as found in the DeepBench Sparse GEMM discussed above, the approach presented herein performs at least 10 times better: 21.8 TOPS for the presented approach against approximately 1.5 TOPS in the DeepBench Sparse GEMM. The performances quoted herein were produced without using explicit placement constraints; that is, just compiling high level code and using a proprietary compiler tool-chain to produce VHDL. To produce the statistics below, this VHDL was put on an FPGA using standard synthesis tools.

The statistics provided below are for sparse-matrix-times-vector circuits targeted at Long Short-Term Memory (LSTM) type workloads, for example speech recognition, speech synthesis, speech transcription or machine translation. The FPGA Board used is an Arria® 10 GX1150 (10AX115N2F40E2LG, −2 speedgrade) produced by Intel Corporation. The sparse matrix was of size 7680×2560 at 90% sparsity (10% non-zero elements). This matrix size matches that from the DeepBench Sparse GEMM benchmark and fits in the BRAMs of the FPGA used. The circuit performance found was 2.46 TOPS INT8, equivalent to a dense matrix-times-vector performance of 24.6 TOPS/s INT8. The board usage is: AIM 79%; M20K 79%; DSP 99%. The clock frequency is 293 MHz. This was without using explicit placement constraints.

At the clock frequency currently achieved these results are at least 1.6 times better than the DeepBench Sparse GEMM discussed above. Using explicit placement constraints may allow an operating frequency close to 400 MHz to be reached, which would give an equivalent-to-dense performance of 33.6 TOPS INT8. On the bigger Stratix® 10 FPGA produced by the Intel Corporation, the solution presented herein could achieve 84% logic usage and 100% of DSP usage, corresponding to 11.3 TOPS sparse-matrix performance at 500 MHz or 113 TOPS at a performance equivalent to that for dense-matrices.

By using the distributed memories found in modern FPGAs to store multiple copies of vector elements and pre-processing of the matrix to store indices into these memories, circuits using the presented method perform 100 times better than existing sparse matrix times vector implementation, and over two times better than state of the art dense matrix vector circuits.

Although a specific embodiment has now been described, the skilled person will understand that various modifications and variations are possible. Firstly, it should be noted that the hardware discussed in this disclosure can be varied considerably. Whilst an FPGA implementation is currently seen as beneficial, other hardware and/or software embodiments can be considered, with different memory and/or processor configurations. Other types of programmable logic circuit or dedicated logic hardware may be implemented. The approach can also be implemented in software (such as a computer program) on an existing computer hardware system or a combination of new hardware and software can be used.

The storage of the vector parts can be achieved in a variety of different ways, for instance to allow parallel random access to each vector part. The FPGA implementation described herein uses memory devices with a single read port to store respective, distinct vector parts in respective memory blocks. Existing memory devices with two read ports do not typically come in a configuration that would allow efficient use all the resources of the FPGA. Consequently, in the implementation described above, each vector part is stored in a distinct memory device. Separate memory devices (such as the BRAMs used in the embodiment above) are one such example, but a single memory device with multiple parallel access channels can be considered. Although this would not be an efficient use of resources of existing FPGAs, storing two vector parts on a single two-port memory device would be functionally the same. Optionally, the matrix may be stored in data storage 10 in a non-compressed format.

In the above description, each of the non-zero values of a row of the matrix is multiplied by the respective element of the vector having a corresponding index stored in the associated memory block, in a single clock cycle. This is considered advantageous. However, an alternative embodiment may split this between two or more clock cycles, in other words, only some of the non-zero values of a row of the matrix are associated with a memory block that stores an element of the vector having an index corresponding with a respective index of the non-zero value. Then, only those non-zero values of the row that are associated with a memory block are multiplied by the respective element of the vector having a corresponding index stored in the associated memory block in a single clock cycle (a first clock cycle).

Subsequently, each of others of the non-zero values of the row of the matrix are associated with a respective memory block that stores an element of the vector having an index corresponding with a respective index of the non-zero value (preferably in a one-to-one mapping). Each of the others of the non-zero values of the row of the matrix are multiplied (in parallel) by the respective element of the vector having a corresponding index stored in the associated memory block. In particular, this second set of parallel multiplications (and associations) is carried out within a second clock cycle (which may be the immediately subsequent clock cycle after the first clock cycle), in some cases, the processing (associating and/or multiplications) for a single row of the matrix may be spilt over more than two clock cycles.

In general, the majority (that is at least 50% and preferably at least 60%, 70%, 80%, 90%, 95%. 98% or 99%) of the rows of the matrix are processed in a single clock cycle, with only the small subset of rows remaining being processed over multiple clock cycles.

Variation in the assignment of vector elements to each vector part and/or the way in which the vector parts are stored in memory blocks is also contemplated, in the example discussed above, a fixed set of vector parts each consisting of contiguous vector elements were considered. In a similar but alternative approach, other fixed sets of vector parts may be considered, for example using n on-consecutive windows and/or (each subset) comprising randomly scattered elements (indices) of the vector (for example, such that at least one or each of the vector parts comprises a randomly selected grouping of elements of the vector). Another approach is to partition the vector into subdivisions (for example, splitting the vector into non-overlapping subdivisions) and then form each vector part by taking up to one value (that is, zero or one value) from each partition or subdivision. In other words, each vector part comprises (or is) a selection of up to one element from each of a plurality of non-overlapping subdivisions of the vector. Taking more than one value from each partition is also possible.

Further alternative ways to group vector elements into a plurality of vector parts can be considered by the skilled person. In particular, the assignment of vector elements to vector parts might be configurable and optimised for a given matrix. Optimisation can refer to minimizing the number of cycles required to perform a matrix vector multiplication; or to equalising the sizes of the memory blocks (so they all hold the same number of elements); or to minimising the size of the biggest memory block; or to compatibility with the circuit used to fill the memory blocks from the vector input, or to any combination of these and other desirable properties.

These approaches, especially optimising the assignment, may allow for more efficient use of vector parts with potentially less overprovisioning. Moreover, the use of a bipartite graph matching algorithm for associating non-zero matrix elements with vector parts may extend to these cases. Practically however, it may be more complicated to populate configurable vector parts (such as non-consecutive windows) in a silicon circuit and this may have an impact on any net improvement in efficiency.

APPENDIX A—PYTHON CODE: SMXV.PV

```
1
2 #coding: utf-8
3
4
5 import numpy as np
6 import networkx as nx
7 import logging
8 import time
9 import matplotlib.pyplot as plt
10 from tqdm import *
11
12 #global logger
13 logging.basicConfig( )
14 log=logging.getLogger( )
15 log.setLevel(logging.DEBUG)
16
17 #fix a seed for reproducible runs
18 np.random.seed(42)
19
20
21 def rand_matrix(size, sparsity, rand=np.random):
22 """
23 generate a +ve valued matrix with the % sparsity specified
24 """
25 multiplier=1.0/(1−sparsity) if 0.0<sparsity<1.0 else 1.0
26 return np.maximum(rand.unifomi(size=size)−sparsity, 0.0)*multiplier
27
28
29 def regular_windows(n_cols, window_size, spacing):
30 """
31 regular, possibly overlapping, windows
32 returns a list of tuples
33 """
34 return [tuple(x % n_cols for x in range(i, i+window_size)) for i in ranged(0, n_cols, spacing)]
35
36
37 def compute_matching(indices, windows):
38 """
39 Given the nonzero_indices for a matrix row and a set of windows, use
40 bipartite graph matching to select a subset of windows containing the
41 necessary indices for one row of the product
42
43 Uses Hopcroft-Karp algorithm/bi-partite graph matching to produce a maximal set of edges
44 (array element to window) such that each non-zero value is contained in only one window
45 """
46 my_graph=nx.Graph(((idx, (j, win)) for j, win in enumerate(windows) for idx in indices if idx in set(win)))
47 return nx.algorithms.bipartite.maximum_matching(my_graph, top_nodes=indices)
48
49
50 def nonzero_indices(row):
51 """
52 return a list of indices to the non-zero 'row' elements
53 """
54 return [idx for (idx, val) in enumerate(row) if val]
55
56
57 def compile_row(row, windows, pbar=None):
58 """
59 takes a row from a sparse matrix and a list of 'window' tuples
60 and outputs a minimal covering of all non-zero values covered by each window and the
61 idx of the window tuple element that contains the non-zero value e.g.
62
63 Input: Non-zero Row Values
64 A B C D
65 [|||||]
66 [|||||]
67 [|||||]
68 Cover—^window_size, window_spacing=5, 3
69
70 row_by_window (A, C, D) (three windows, the non-zero values they contain)
71 v_idx_by_window (1, 0, 4) (three windows, the index of the window tuple that covers the non-zero values contained)
72
73 Not all values covered, len(unmatched)==1, so go again . . .
74
75 Non-zero Row Values not covered so far
76 B
77 [|A||C|]
78 [|||||]
79 [|||||D]
80 Cover—^
81
82 row_by_window (B, 0.0, 0.0) (three windows, the non-zero values they contain)
83 v_idx_by_window (2, None, None) (three windows, the index of the window tuple that covers the non-zero value
84 contained).
85
86 All values covered, return
87
88 cycles=[{('values': (A, C, D). 'indices': (1, 0, 4)},
89 {'values': (B, 0.0, 0.0), 'indices': (2, None, None)}]
90 """
91 cycles=§
92 #the non zero indices of the row
93 unmatched=nonzero_indices(row)
94
95 while len(unmatched):
96 #use Hopcroft-Karp algorithm/bi-partite graph matching to produce a maximal set of edges (array element to
97 #window) such that each non-zero value is contained in only one window
98 matching=compute_matching(unmatched, windows)
99
100 #matching[(j, win)] the row idx of the non-zero element covered by win
101 #row[matching[(j, win)]]=the non-zero row element covered by win
102 #win.index(matching[(j, win)])=the index of the element in the window that covers the non-zero element
```

```
103
104 #for every window put the single value of the row covered by that window in an array
105 #or put zero if the window contains no value
106 row_by_window=[row[matching[(j, win)]] if (j, win) in matching else 0.0
107 for (j, win) in enumerate(windows)]
108
109 #for every window put the single idx of the window that covers the non-zero element of the row in a list
110 #or put None if the window will contain no value
111 v_idx_by_window=[win.index(matching[(j, win)]) if (j, win) in matching else None
112 for (j, win) in enumerate(windows)]
113
114 #remove the nonzero indices now covered
115 unmatched=[idx for idx in unmatched if idx not in matching]
116 cycles.append({'values': np.array(row_by_window), 'indices': np.array (v_idx_by_window)})
117
118 if pbar:
119 pbar.update(1)
120 return cycles
121
122
123 def compute_matrix_times_v(compiled__matrix, window_values):
124 """
125 matrix time vector using the window covering of vector i.e. duplicating elements but only doing work
126 where the window value is not zero
127 """
128 return np.array([sum(sum(val*win[idx] for (val, idx, win) in
129 zip(cycle['values'], cycle['indices'], window_values) if val) for cycle in
130 row) for row in compiled_matrix])
131
132
133 def test_compiled_matrix(n_rows=1000, n_cols=512, sparsity=0.9):
134 """
135 1. Generate a random test case
136 """
137 window_size, window_spacing=64, 8
138 rand=np.random
139 #Quicker to test this method with:
140 #n_rows, n_cols, window_size, window_spacing=8, 8, 3, 2
141
142 #Sparse 'weights' matrix
143 random_matrix=rand_matrix((n_rows, n_cols), sparsity, rand)
144 #Dense 'activation' vector
145 random_v=rand.untform(size=n_cols)
146
147 """
148 2. Compile to our sparse matrix format
149 """
150 start=time.time( )
151 #window_values is a covering/reprn of random_v by windows
152 windows=regular_windows(n_cols, window_size, window_spacing)
153 window_values=[random_v[list(w)] for w in windows]
154 with tqdm(total=random_matrix.shape[0]) as pbar:
155 compiled_matrix=[compile_row(row, windows, pbar) for row in random_matrix]
156
157 log.info('Test_compiled_matrix took % g seconds', time.time( )−start)
158
159 """
160 compiled_matrix is therefore a list of cycles lists where e.g.
161 compiled_matrix=[{'values': (A, C, D), 'indices': 1, 0, 4)},
162 {'values': (B, 0.0, 0.0). 'indices': (2, None, None)}]
163
164 3. Compute M times v and check the result
165 """
166 matrix_times_v=compute_matrix_times_v(compiled_matrix, window_values)
167 nnz=sum(1 for val in np.nditer(random_matrix) if val)
168
169 processors=len(windows)
170 #all the multiplications can be done in one cycle so
171 cycles=sum(map(len, compiled_matrix))
172 efficiency=float(nnz)/(cycles*processors)
173 err=np.max(np.abs(matrix_times_v−np.dot(random_matrix, random_v)))
174 log.info('\n'.join(['rows; % g' % n_rows,
175 'columns: % g' % n_cols,
176 'sparsity: % g' % sparsity,
177 'nonzeros: % g' % nnz,
178 'processors: % g' % processors,
179 'cycles: % g' % cycles,
180 'efficiency % g' % efficiency.
181 'error % g' % err]))
182
183
184 def write_cycles(compiled_matrix):
185 """
186 when 'compiled_matrix' is a list of 'compiled' rows of a sparse matrix (or block where
187 each 'block' is a column subset of an original sparse matrix),
188 write_cycles returns something like array([2, 3, 4] i.e.
189 the cumulative sum of cycles needed to process each row of that subset
190 i.e. me last element is the number of cycles needed to calculate all the rows in the matrix
191 """
192 return np.cumsum([len(cycles) for cycles in compiled_matrix])
193
194
195 def read_cycles(compiled_matrices):
196 """
197 when 'compiled_matrices' is actually a list of lists of 'compiled' rows of sparse matrix blocks,
198 each 'block' a column subset of an original sparse matrix,
199 read_cycles returns something like array([2, 3, 4] i.e
200 the maximum time to process the first row of each subset, then the second . . .
201 """
202 return np.array([max(cycles) for cycles in zip(*map(write_cycles, compiled_matrices))])
203
204
205 def min_queue_lengths(compiled_matrices);
206 """
```

207 when 'compiled_matrices' is actually a list of lists of 'compiled' rows of sparse matrix blocks
208 Each 'block' is a column subset of the original sparse matrix
209 cycles here is an array counting the number of clock cycles needed to calculate matrix multiplication
210 down to that row for that subset
211
212 e.g.
213 [[C_0R_0, [C_1R_0, [C_nR_0, [array([1, array([0, array([2, (***)
214 C_0R_1, C_1R_1, C_nR_1,→1, 2, 3,→zip
215 C_0R__2], C_1R_2] ... C__nR__2]] 2]), 3]), 4])]
216
217 zip→[(1, 0, 2),-max→[(2, max # of cycles to calculate
218 (1, 2, 3), 3, each row subset
219 (2, 3, 4)]4)]
220
221 Where each C_iR_i is a compiled row of a matrix i.e.
222
223 C_iR_i={'values': (A, C, D), 'indices': (1, 0, 4)},
224 {'values': (B, 0.0, 0.0), 'indices': (2, None, None)}
225
226 Therefore read_cycles returns—max→[array([2, 3, 4]]
227 i.e. the maximum time to process the first row of each subset, then the second . . .
228
229 Also, min_queue_lengths is just the difference between this 'max' array and the cumulative cycles calculated in step
230 (***) i.e. the number of cycles each subset row calculation needs to be buffered before going to the adder tree
231 """
232 r_cycles=read_cycles(compiled_matrices)
233 return [max(r_cycles−write_cycles(m)) for m in compiled_matrices]
234
235
236 def cycles_needed_for_calculation(compiled_matrices):
237 """
238 When 'compiled_matrices' is actually a list of lists of 'compiled' rows of sparse matrix blocks
239 This function returns the total number of cycles we have to wait before we can read all values from the adder tree
240 It is the maximum of the cumulative sum of the cycles needed for each subset of columns
241 due to the 'split' of the matrix i.e.
242
243 read_cycles( . . . ) returns the maximum time to process the (first row of each subset, then the second . . . )
244 """
245 return max(read_cycles(compiled_matrices))
246
247
248 def test_sparse_matrix_split( ):
249 """
250 Sparse 'weights' matrix, split by row then split across columns
251
252 We need to split into column subsets which progress at different rates beyond a certain length (say 256 or 512)
253 otherwise we end up stalling on every row.
254
255 Discussion:
256 An alternative to the approach presented here is to skip the work we can't do as we go along instead of stalling
257—in which case rows can be as long as we like—and then we need a second process in parallel to compute
258 corrections to add on. This is probably the right approach—the main difficulty is that the corrections matrix
259 is maybe 1% nonzero and to support that level of random access you probably want to use M20Ks instead of MLABs
260 (Memory Logic Array Block) and filling them takes too long.
261
262 M20K blocks are dedicated 20 Kb RAMs that you can use for making memories on the scale of KB. MLABs, memory logic
263 array blocks, are logic resources which can be used either for logic or for small, <1 KB, memories.
264 Basically, the memory logic array blocks are how you use LUTs as RAM. DSPs: embedded hard digital signal
265 processing blocks are very power efficient and operate at far higher frequencies than the equivalent circuits in
266 a soft implementation
267 """
268 rand=np.random
269 n_blocks=7
270 n_rows, n_cols, sparsity=800, n_blocks*512, 0.9
271 window_size, window_spacing=64, 8
272
273 #Quicker to test this method with:
274 #n_blocks, n_rows, n_cols, window_size, window_spacing=3, 6, 6, 2, 2
275 sparse_matrix=rand_matrix((n_rows, n_cols), sparsity, rand)
276 sparse_matrix_split=np.split(sparse_matrix, n_blocks, axis=1)
277
278 """
279 WARNING: Stow for 800*(7*512)
280 """
281 start=time.time( )
283 with tqdm(total=sum(m.shape[0] for m in sparse_matrix_split)) as pbar:
284 pbar.set__description("Compiling M=(% s, % s) Sparsity=% s" % (n_rows, n_cols, sparsity))
285 compiled_matrices=[[compile_row(row, windows, pbar) for row in m] for m in sparse_matrix_split]
286
287 """
288 Queues are needed for merging the outputs from say 7 length 512 dot products into one length 3584 dot product
289 We need these queues as the 7 blocks progress at different rates and everything runs in parallel
290 Efficiency will be almost what you would get if row length was 512 (minus a little correction since we have
291 to wait for the slowest of the 7 blocks to finish
292 """
293 q_lengths=min_queue_lengths(compiled_matrices)
294 log.info('min_queue_lengths % s', q_lengths)
295 log.info('cycles_needed_for_calculation % s', cycles_needed_for_calculation(compiled_matrices))
296 log.info('Test_sparse_matrix_split took % g', time.time( )−start)
297
298 cycles=cycles_needed_for_calculation(compiled_matrices)
299 nnz=sum(1 for val in np.nditer(sparse_matrix) if val)
300 processors=len(windows)
301 efficiency=float(nnz)/(cycles*processors)
302 log.info('\n'.join(['rows: % g' % n_rows, 303 'columns: % g' % n_cols.
304 'sparsity: % g' % sparsity,
305 'non zeros: % g' % nnz,
306 'processors: % g' % processors,
307 'cycles: % g' % cycles.
308 'efficiency %.3f' % efficiency]))
309
310
311 if name=="main":
312 num_rows, num_cols, sparsity_value=1000, 512, 0.9
313 test_compiled_matrix(num_rows, num_cols, sparsity_value)
314 test_sparse_matrix_split( )
315 num_rows, num_cols, sparsity_value=1000, 128, 0.9
316 test_compiled_matrix(num_rows, num_cols, sparsity_value)

The invention claimed is:

1. A method for multiplication of a matrix of size M×N with a vector of size N by a processor arrangement, the matrix being a sparse matrix including a plurality of zero values, the method comprising:
   storing the matrix in a data storage linked to the processor arrangement, in a compressed format, such that zero values are not stored;
   storing the vector in the data storage as a plurality of vector parts, each vector part being of a respective size $K_i$, $1 < K_i < N$ and $i=1 \ldots P$, at least one vector part comprising at least one element of the vector in common with at least one other vector part and each vector part being stored in a distinct memory block of the data storage;
   associating each of a plurality of the non-zero values of a row of the matrix with a respective memory block that stores an element of the vector having an index corresponding with a respective index of the non-zero value; and
   multiplying by the processor arrangement, in parallel, each of the plurality of the non-zero values of the row of the matrix by the respective element of the vector having a corresponding index stored in the associated memory block.

2. The method of claim 1, further comprising:
   adding a result of each of the multiplications, to provide a single multiplication output for the row of the matrix; and
   storing the single multiplication output for the row of the matrix in the data storage.

3. The method of claim 1, further comprising:
   repeating the steps of associating and multiplying for each row of the matrix.

4. The method of claim 1, wherein the step of associating uses a bipartite graph matching algorithm.

5. The method of claim 1, further comprising:
   assigning each element of the vector to one or more of the plurality of vector parts based on a structure of the matrix, the step of storing being performed in accordance with the assigning.

6. The method of claim 1, wherein at least one of the vector parts comprises a contiguous sequence of elements of the vector, a specified subset of elements of the vector, a randomly selected grouping of elements of the vector or a selection of up to one element from each of a plurality of non-overlapping subdivisions of the vector.

7. The method of claim 1, wherein the step of multiplying is carried out within a single clock cycle of the processor arrangement.

8. The method of claim 1, wherein the plurality of the non-zero values of a row of the matrix comprises all of the non-zero values of the row of the matrix.

9. The method of claim 1, wherein the plurality of the non-zero values of a row of the matrix consists of some of the non-zero values of the row of the matrix, the method further comprising:
   associating each of others of the non-zero values of the row of the matrix with a respective memory block that stores an element of the vector having an index corresponding with a respective index of the non-zero value; and
   multiplying by the processor arrangement, in parallel, each of the others of the non-zero values of the row of the matrix by the respective element of the vector having a corresponding index stored in the associated memory block; and
   wherein the step of multiplying each of the others of the non-zero values of the row takes place subsequently to the step of multiplying each of the some of the non-zero values of the row.

10. The method of claim 9, wherein the step of multiplying each of the some of the non-zero values of the row is carried out within a first clock cycle of the processor arrangement and the step of multiplying each of the others of the non-zero values of the row is carried out within a second clock cycle of the processor arrangement, the second clock cycle being subsequent to the first clock cycle.

11. The method of claim 1, wherein each of the plurality of vector parts has the same size, K.

12. The method of claim 1, wherein the size of each of the plurality of vector parts, $K_i$, is greater than the size of the vector, N, divided by the number of vector parts, P.

13. The method of claim 1, wherein the density of the sparse matrix is at least 1% and no more than 20%.

14. A non-transitory computer readable medium storing a computer program, configured to carry out the method of claim 1 when executed by a processor arrangement.

15. A computing system for multiplication of a matrix of size M×N with a vector of size N, the matrix being a sparse matrix including a plurality of zero values, the computing system comprising:
   data storage configured to store the matrix in a compressed format, such that zero values are not stored and to store the vector as a plurality of vector parts, each vector part being of a respective size $K_i$, $1 < K_i < N$ and $i=1 \ldots P$, at least one vector part comprising at least one element of the vector in common with at least one other vector part and each vector part being stored in a distinct memory block of the data storage; and
   a processor arrangement, linked to the data storage and configured to associate each of a plurality of the non-zero values of a row of the matrix with a respective memory block that stores an element of the vector having an index corresponding with a respective index of the non-zero value and to multiply, in parallel, each of the plurality of the non-zero values of the row of the matrix by the respective element of the vector having a corresponding index stored in the associated memory block.

16. The computing system of claim 15, configured to perform the method of claim 2.

17. The computing system of claim 15, wherein the data storage comprises a plurality of memory devices, each memory block being part of a different respective memory device.

18. The computing system of claim 15, wherein the processor arrangement comprises a plurality of multiplier units, each multiplier unit being configured to multiply one of the plurality of the non-zero values of the row of the matrix by the respective element of the vector having a corresponding index stored in the associated memory block.

19. The computing system of claim 15, wherein the processor arrangement comprises a programmable logic circuit.

* * * * *

UNITED STATES PATENT AND TRADEMARK OFFICE
CERTIFICATE OF CORRECTION

PATENT NO. : 11,429,692 B2
APPLICATION NO. : 16/421852
DATED : August 30, 2022
INVENTOR(S) : Page et al.

It is certified that error appears in the above-identified patent and that said Letters Patent is hereby corrected as shown below:

On the Title Page

Item (30) Foreign Application Priority Data: Please correct "(GB)............18108629" to read -- (GB).............1808629.8 --

In the Specification

Column 9, Line 13: Please correct "is: AIM 79%" to read -- is ALM 79% --

Column 12, Line 37: Please correct "79 [||||ID]" to read -- 79[||||D] --

Column 14, Line 45: Please correct "190 i.e., me last" to read -- 190 i.e., the last --

Column 16, Line 39: Please insert the following -- 282 windows = regular_windows(n_cols, window_size, window_spacing) --

Signed and Sealed this
Eighteenth Day of October, 2022

Katherine Kelly Vidal
*Director of the United States Patent and Trademark Office*